United States Patent [19]

Ferrell

[11] Patent Number: 4,582,549
[45] Date of Patent: Apr. 15, 1986

[54] METHOD AND APPARATUS FOR PRODUCING BAG MAKING MATERIAL HAVING RECLOSABLE FASTENERS

[75] Inventor: Robert A. Ferrell, Shelbyville, Ind.

[73] Assignee: Minigrip, Inc., Orangeburg, N.Y.

[21] Appl. No.: 712,145

[22] Filed: Mar. 15, 1985

[51] Int. Cl.⁴ ............................................. B29D 5/10
[52] U.S. Cl. ..................................... 156/66; 156/192; 156/204; 156/244.11; 156/244.25; 156/465; 156/500; 383/63; 428/223; 493/214
[58] Field of Search ..................... 53/551; 156/66, 204, 156/244.11, 244.25, 461, 465, 500, 184, 192; 383/63, 95, 97; 428/57, 223; 493/214

[56] References Cited

U.S. PATENT DOCUMENTS

| Re. 28,959 | 9/1976 | Naito | 29/450 |
| 3,787,269 | 1/1974 | Noguchi | 156/498 |
| 3,853,671 | 12/1974 | Ausnit | 156/66 X |
| 4,101,355 | 7/1978 | Ausnit | 156/66 |
| 4,249,982 | 2/1981 | Ausnit | 156/461 |
| 4,259,133 | 3/1981 | Yagi | 156/244.11 |
| 4,279,677 | 7/1981 | Takahashi | 383/63 X |
| 4,341,575 | 7/1982 | Herz | 156/66 |
| 4,355,494 | 10/1982 | Tilman | 493/214 X |
| 4,419,159 | 12/1983 | Herrington | 156/66 |
| 4,528,224 | 7/1985 | Ausnit | 156/204 X |

Primary Examiner—Robert A. Dawson
Attorney, Agent, or Firm—Hill, Van Santen, Steadman & Simpson

[57] ABSTRACT

Apparatus and method for making bag material from a continuous length of sheet. Side portions of the sheet are turned from opposite sides, and the sheet advanced through a joining station wherein extruded complementary separable fastener profile strips are joined to face of the flange portions which are directed away from the body of the sheet. The sheet carrying the joined fastener strips may then be advanced through a curing station. Subsequently the sheet and fastener strip assembly is conducted through a spreading station wherein the flange portions are spread apart. Downstream from the spreading station the spread sheet may be folded upon itself in a folding station wherein the profiles of the fastener strips may be interengaged, and the folded material may then be wound into a storage roll.

28 Claims, 9 Drawing Figures

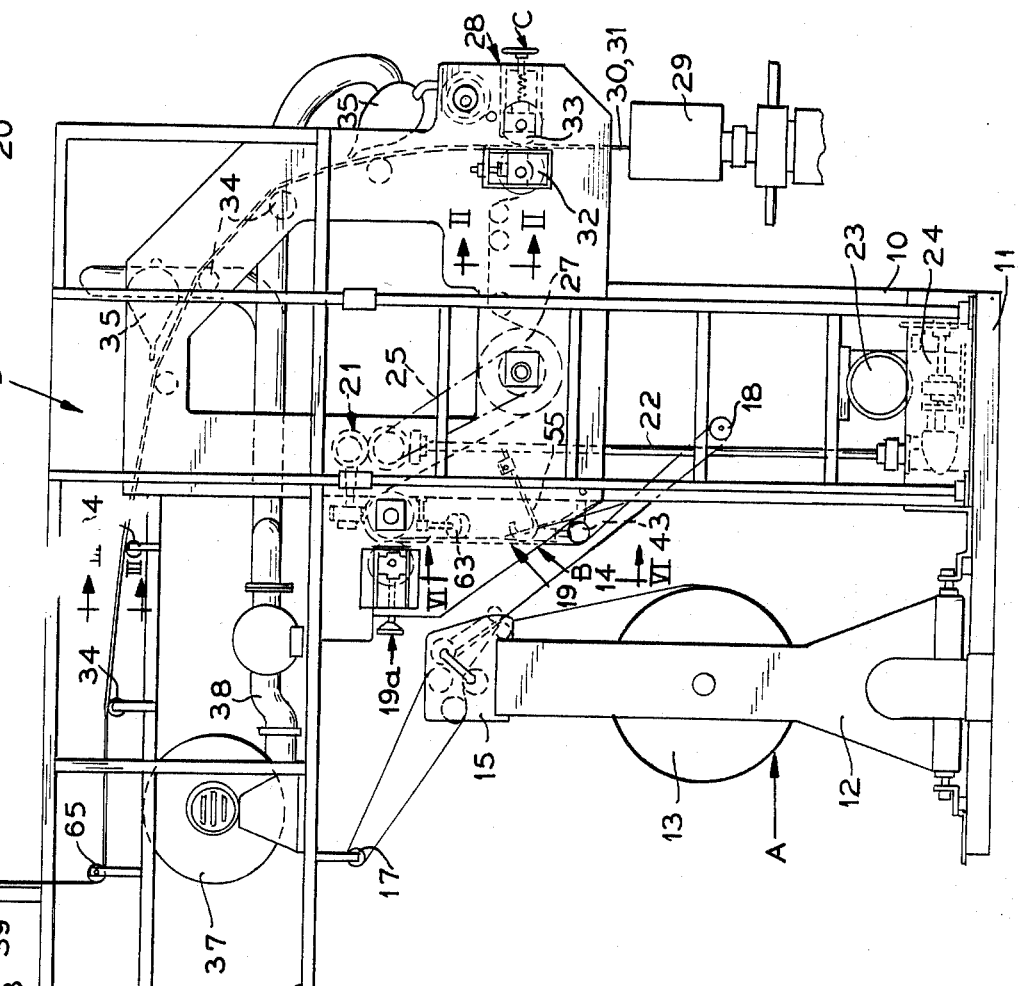
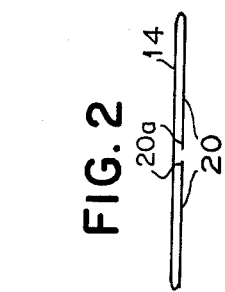
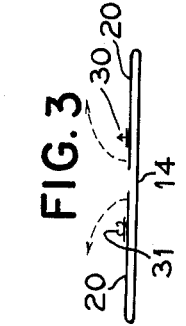
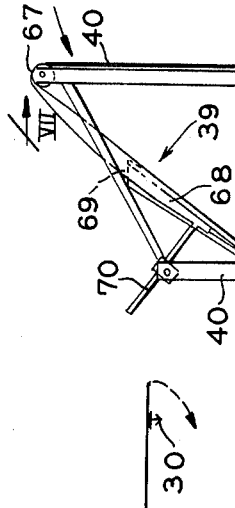
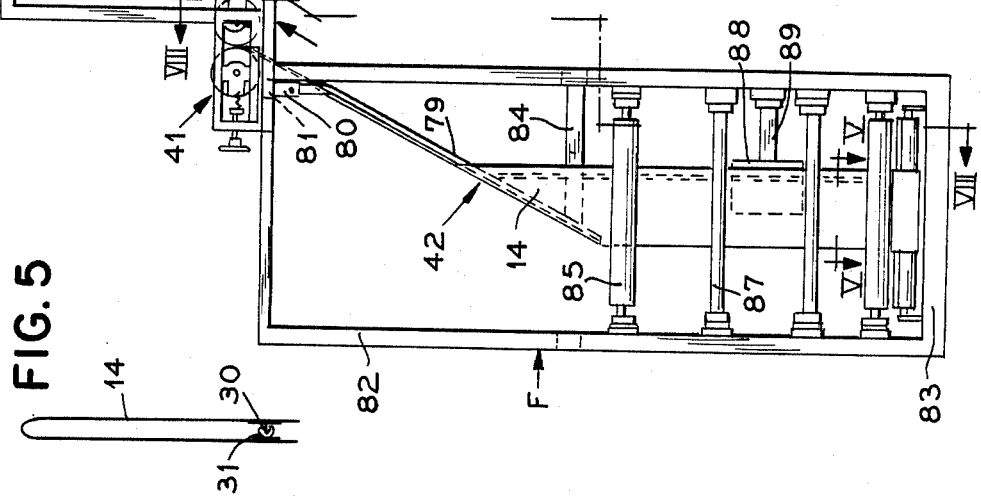

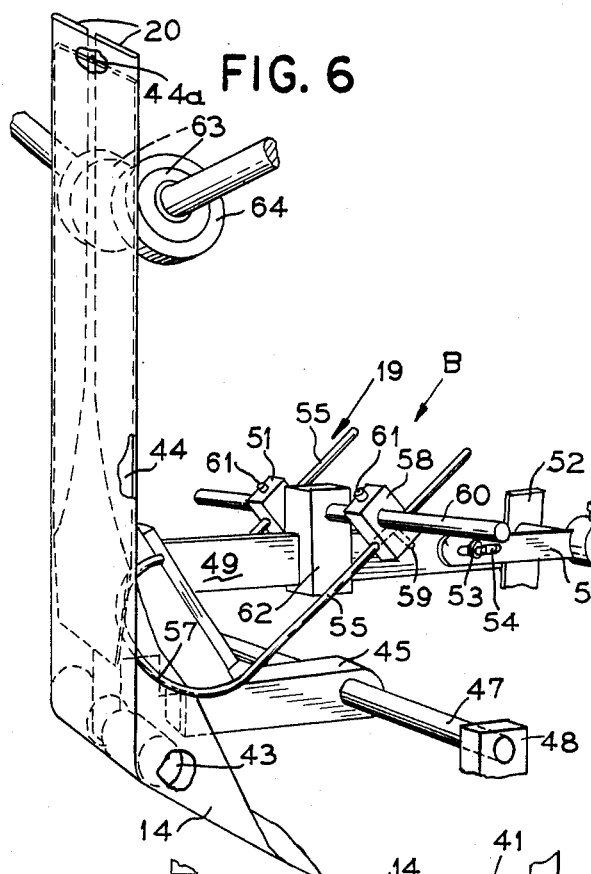
FIG. 6
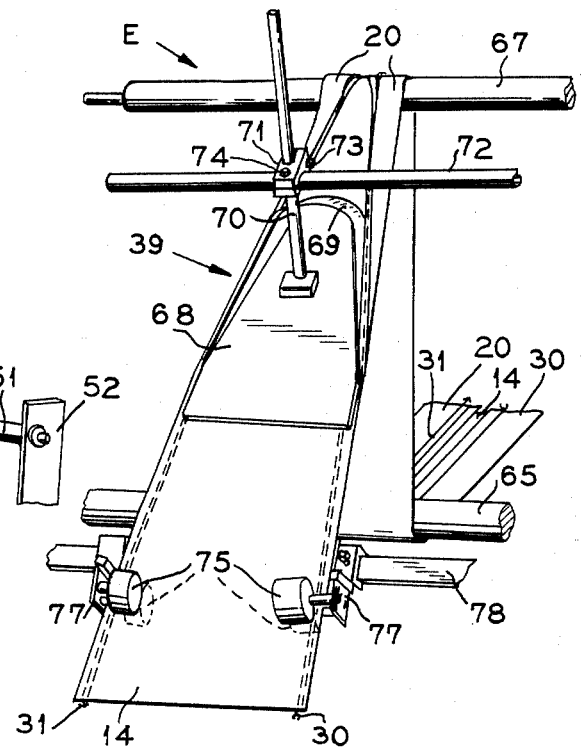
FIG. 7
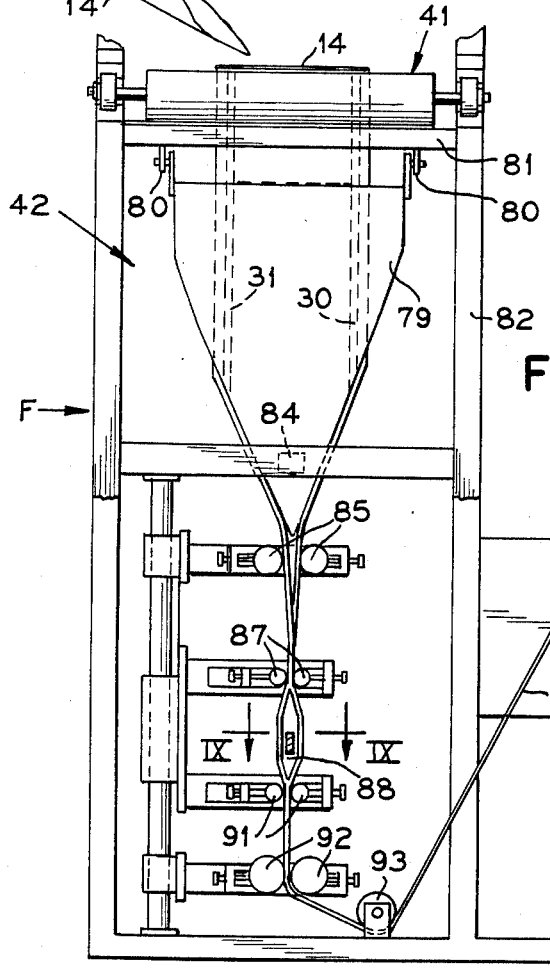
FIG. 8
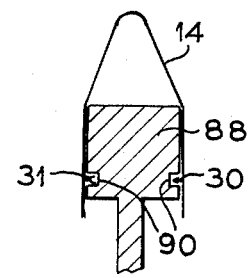
FIG. 9
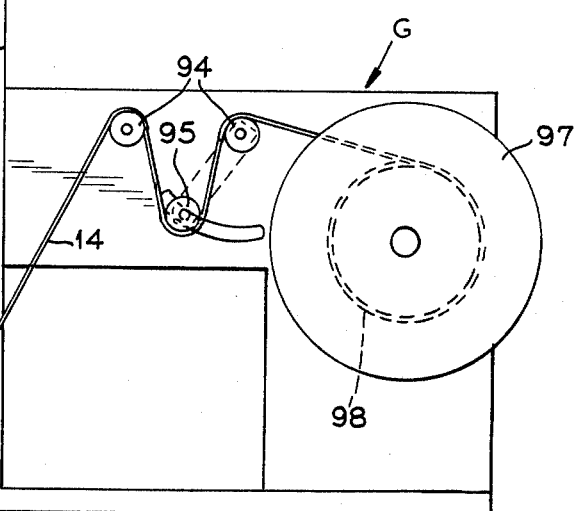

METHOD AND APPARATUS FOR PRODUCING BAG MAKING MATERIAL HAVING RECLOSABLE FASTENERS

BACKGROUND OF THE INVENTION

This invention relates to a method and apparatus for producing bag making material, and is more particularily concerned with producing such material from laminated film which is equipped with extruded complementary separable fastener profile strips.

Bag making material of this general type may be produced in apparatus as disclosed in U.S. Pat. No. 3,787,269, but which has certain limitations that are overcome by the present invention. To any extent necessary for better understanding of the present invention, the disclosure of this patent is included herein by reference.

As pointed out in that patent, conventional reclosable plastic bags featuring various types of plastic fasteners have consisted of a simple combination of fastener means and bag bodies, both of which are formed integrally and at the same time, often monolithically extruded, of a single plastic or resin material, such as, polyethelyene or polypropylene. Since such extrusion forms a single sheet that is not absolutely airtight, bags made therefrom are inadequate for medicines or foods, the quality of which might be affected by intrusion of air or moisture. To alleviate that problem, the bag bodies have been formed of more air impervious laminated films, which may be formed from cellophane, and/or paper, and/or aluminum, etc., and with a resin coating such as polyethelyene or other plastic. However, production of such laminated films or sheets and fastener means by extruding both the film and the fastener means at the same time is virtually impossible. Further, considering the matter in reverse, a method of laminating another different film or substrate on a monolithically formed fastener carrying extruded film is not desirable, because in the attachment process the pressure that may be added for attaching the sheet elements together, generally requiring heating and pressure, may cause changes in the structural form of the fastener means.

There is more disclosure in the aforesaid patent relating to particular treatment by way of heating and controlled coolant to avoid wrinkling and the like, and which in view of the patent disclosure may be only superficially alluded to herein. Solution of a different problem is addressed herein.

That problem arises because in the machine of the patent disclosure there has been a limitation on the type of bag material that may be produced. That is, the patent disclosure teaches only the production of open bottom bag material, wherein the separable fastener profiles strips are attached in such a manner at the longitudinal central portion of the sheet that by folding the sheet upon itself the fasteners will be brought together at a closed top of the bag, while the bottom of the bag will be left open for filling from the bottom and the bottom opening then sealed.

On the other hand, efficient bag filling machines have been developed for filling separable fastener equipped bags from the top by separating, or maintaining separated, the separable fastener elements and then forcing the fastener elements into bag closing cooperation. It is to the production of open top, close bottom, top fillable bag material that the present invention is directed, while utilizing other desirable attributes of the machine disclosed in the aforesaid patent.

Just by way of further background, certain other prior art patents may be referred to as follows:

U.S. Pat. No. Re. 28,959 discloses the monolithic, tubular extrusion of bag making film and fastener profiles for the production of open top bags.

U.S. Pat. No. 4,101,355 discloses applying freshly extruded fastener strips to freshly extruded film, or attachment of preformed fastener strips to preformed film by adhesive means, but wherein all of the attachment or joinder of components is effected while the film or sheet is travelling in a flat state.

U.S. Pat. No. 4,259,133 discloses concurrent extrusion of film and fastener profile strips which are immediately fused together to, in effect, produce a monolithic structure for either open bottom or open top bag making material.

U.S. Pat. No. 4,341,575 discloses applying prefabricated fastener strip to prefabricated film by means of adhesive bonding, for producing either open top or open bottom bag material. There is no indication of applying freshly extruded fastener strip to preformed film in this patent disclosure.

In none of the foregoing patent disclosures is there any suggestion to be derived for producing open top, closed bottom bag material by simple, efficient modification of apparatus according to the disclosure in aforesaid U.S. Pat. No. 3,787,269. In particular those prior patents do not teach how to join fastener strips, extruded from adjacently spaced extrusion orifices, to the opposite side portions of travelling continuous web, film or sheet, so that the profiles of the strips will join for separably closing open top bags when the sheet is folded on itself and the fold provides for closed bottoms for the bags.

SUMMARY OF THE PRESENT INVENTION

It is therefore an important object of the present invention to provide a new and improved method of and apparatus for producing open top bag making material, by adapting apparatus such as disclosed in U.S. Pat. No. 3,787,269 for this purpose.

Another object of the invention is to provide a new and improved method of and apparatus for producing bag making material wherein complementary fastener strips extruded adjacent to one another are applied to opposite longitudinal side portions of prefabricated film or web sheet.

Still another object of the invention is to provide a new and improved method of and apparatus for producing top open, bottom closed bag making material in existing apparatus designed for top closed open bottom bag making material.

To this end, there is provided a method of and apparatus for making bag material, wherein there is advanced from a supply station into a flange-turning station a continuous length sheet, and opposite side portions of the sheet are turned for providing flanges having faces directed away from the body of the sheet. The sheet with turned flanges then runs through a joining station where there are permanently attaching to the directed away faces extruded complementary separable fastener profile strips in an orientation which will permit subsequent separable joining together of the profiles of the strips. The sheet/profile strip assembly may then run through a curing station.

The method and apparatus may further provide for spreading the fastener strip carrying flanges in a spreading station to lie generally in the plane of the sheet, and the sheet may then be wound into one or more storage rolls. On the other hand, the thus spread sheet may be run through a folding station and medially folded upon itself to bring the fastener profiles into fastening alignment with one another. If the bag making material is to be stored before being separated into filled bags, the thus folded material may be rolled up into storage rolls in a winding station. Thus, the bag making material may be supplied for convenient subsequent use, either wound fully laterally extended and then folded into bag form at the point of use such as in a form/fill apparatus exemplified in U.S. Pat. No. 4,355,494, or in the folded condition for filling and separation into individual bags in known manner.

BRIEF DESCRIPTION OF THE DRAWINGS

Other objects, features and advantages of the invention will be readily apparent from the following description of a representative embodiment thereof, taken in conjunction with the accompanying drawings although variations and modifications may be effected without departing from the spirit and scope of the novel concepts embodied in the disclosure and in which:

FIG. 1 is a more or less schematic side elevational view of apparatus for practicing the present invention;

FIG. 2 is a transverse sectional detail view taken substantially along the line II—II in FIG. 1, and showing the sheet material as turned upon itself from opposite sides prior to joining of the fastener strips to the thus turned flanges;

FIG. 3 is a transverse sectional view taken substantially along the line III—III in FIG. 1, showing the material after the fastener strips have been applied to the turned flanges;

FIG. 4 is a transverse sectional view taken substantially along the line IV—IV in FIG. 1, showing the material after the turned flanges have been spread to the generally flat plane of the sheet;

FIG. 5 is a transverse sectional view taken substantially along the line V—V in FIG. 1, and showing the bag making material folded upon itself with the complementary fasteners interengaged;

FIG. 6 is an enlarged fragmentary prespective view taken substantially along the line VI—VI in FIG. 1;

FIG. 7 is an enlarged fragmentary prespective view taken substantially along the line VII—VII in FIG. 1;

FIG. 8 is an elevational view taken substantially along the line VIII—VIII in FIG. 1; and FIG. 9 is an enlarged fragmentary sectional detail view taken substantially along the line IX—IX in FIG. 8.

DETAILED DESCRIPTION

As seen in FIG. 1, the bag making material apparatus or machine comprises a frame 10 that may be mounted on a base 11 on which may also be mounted a sheet supplying station A including a stand 12 for rotatibly supporting a roll 13 of preferably laminated film sheet 14 having a suitable substrate carrying on one surface a layer of fusible plastic such as polyethelyene. From the roll 13, the sheet 14 passes upwardly through a tension control device 15 and is looped over an idler roller 17 suspended under an overhead portion of the frame 10. From the idler roller 17 the sheet runs back through the tension roll device 15 and is directed generally obliquely downwardly and runs over an idler roller 18 carried by a lower portion of the frame 10. From the roller 18 the sheet travels generally upwardly through a flange turning station B including a flange turning device 19 wherewith the sheet is turned inwardly from each opposite side to provide flange portions 20 (FIG. 2) having faces directed away from the body of the sheet 14 and with such faces providing parts of the fusible plastic layer of the sheet. The flange portions 20 may have longitudinal edges 20a adjacent to one another.

Above the folder 19, means comprising a drive roll arrangement 19a effects advance of the web or sheet material. Means for driving the roll arrangement 19a comprises a transmission gear system 21 motivated by means of a drive shaft 22 actuated by a motor 23 and an associated gear box 24. Also driven by the shaft 22, through the medium of a flexible drive member such as a chain 25, is a heating roll 27 over which the sheet 14 is drawn after the drive roll arrangement 19a.

From there, the sheet 14 is guided into a joining station C including means 28 wherein an extruder 29 extrudes from suitable thermoplastic material such as polyethelyene, complementary, separable fastener profile strips 30 and 31 (FIGS. 1 and 3) from adjacently spaced orifices (not shown, but well known). The profile strips are drawn upwardly into the nip of pinch rolls 32 and 33 where the freshly extruded fastener strips are joined with and permanently fused to the flanges 20 of the sheet 14. Desirably the joining roll 32 is also heated so as to assure that the thermoplastic coating on the sheet is in a proper heated condition for fusion of the base surfaces of the fastener strips 30 and 31 to the flanges 20.

From the rolls 32, 33 the sheet and fastener strip assembly travels onward through a curing station D on guide rollers 34 in the overhead portion of the frame 10, and chilled under controlled conditions by means of cooling devices 35 which may be supplied with cooling air from a source fan 37 and connecting duct means 38.

After what may be termed the curing and solidifying stage, wherein the bag making assembly is transported on the rollers 34, the assembly is guided through a spreading station E and therein acted upon in a spreader device 39 conveniently mounted on a frame 40 supported on top of the main frame structure 10. In the spreader device 39, the sheet 14, and in particular its inturned, now fastener strip carrying, flanges 20, may be flattened out (FIG. 4), i.e., the flanges 20 are caused to lie generally in the plane of body of the sheet 14. Downstream from the spreader 39, the flattened sheet assembly may pass through a take-up roll assembly 41. Then, if desired, the spread sheet may be wound into storage rolls for subsequent use in a bag finishing machine or a combination bag forming and filling machine.

On the other hand, for use of the bag making material directly in a top loading bag filling machine, it may be preferred to have the bag making material supplied in a folded condition, as shown in FIG. 5, wherein the sheet 14 is doubled, that is folded upon itself, and the profiles of the fastener strips 30 and 31 separable interengaged. Such folding and interlocking of the fastener profiles may be efficiently effected in a folding station F having folding means 42.

As a final step, the folded bag making material may pass into a winding stations G (FIG. 8), where the material is wound into a convenient storage roll.

A more detailed description will now be given of certain mechanisms in various stations of the apparatus and not present in the basic disclosure found in U.S. Pat. No. 3,787,269.

Flange Turning Station B

In the flange turning station B (FIGS. 1 and 6), the bag making material sheet 14 travels generally upwardly to a freely rotating guide or idler roller 43 which is located immediately below an upwardly extending, elongate flange-turning control plate 44. Both the length of the idler roller 43 and the width of the control plate 44 are desirably complementary to the intended width of the body portion of the sheet 14 after the flanges 20 have been turned in along the opposite longitudinal sides of the sheet. Both the roller 43 and the plate 44 are supported by frame structure 45 mounted as by means of a shaft 47 carried by rigid uprights 48 fixed to the frame 10. For stabilizing the plate 44 and permitting accurate adjustment thereof for properly aligning the flanged sheet with the roll device 19a, a bar 49 extends from the base end portion of the plate 44 toward interengagement with an extension bar 50 mounted to a shaft 51 carried by a rigid uprights 52 supported by the main frame 10. For adjustment purposes the bar 49 and the extension 50 are connected by bolt 53 is carried by the bar 49 and extends through an elongated adjustments slot 54 in the contiguous end portion of the bar extension 50.

For turnably infolding the flanges 20, respective deflecting or turning arms 55 having crook shape turning heads 57 angled toward each other are located for engaging and turning and wrapping the opposite side portions of the sheet 14 about the lower portion of the plate 44. The heads 57 are located adjacently above the guide roller 43 and smoothly divert and turn the side flange portions 20 of the sheet toward the plate 44 in a manner to converge the edges of the flanges toward one another, and toward parallelism with the plate 44.

Mounting of the deflecting arms 55 is desirably in a manner to permit accurate adjustment both longitudinally and torsionally about the axis of the straight length of the arms. Conveniently this may be effected by extending each of the arms through a respective mounting block 58 in a manner to permit torsional and longitudinal adjustment of the arm in each instance, and the adjusted position in the block being releasibly maintained by means such as a set screw 59. Each of the blocks 58 may conveniently be supported on a fixed horizontal shaft 60 about which the blocks are torsionally moveable and retained in adjusted position as by means of respective set screws 61. The rod 60 may be fixedly carried by and project to opposite sides of a block 62 mounted on the bar 49.

As the side flanged sheet 14 travels upwardly along the forming plate 44, the flanges 20 are engaged by cambering, toed-in rollers 63 provided with friction tires 64 and which flatten the flanges 20 toward the plate 44 and bias the flanges toward one another for proper dimensioning of the flanged sheet 14 as it moves onward as driven by the roll assembly 19a. A longitudinal guide rib 44a on the plate 44 extends between the edges of the sheet flanges 20.

Spreading Station E

After the bag making assembly has completed its travel through the curing station D, it is diverted about a guide roller 65 (FIGS. 1 and 7), and travels through the spreading station E where it is acted upon by the spreader device 39. To this end, the travelling fastener strip equipped sheet material 14 with the flanges 20 still inturned as shown in FIG. 3, travels upwardly along the upright frame 40 to a guide roller 67 from which the bag making assembly continues generally diagonally downwardly toward the spreader 39 which comprises a spreader plate 68 of a somewhat wedge shape having its narrowest end extending upstream and provided with a blunt nose flange 69 which enters into the generally U-folded inturned flanges 20 and spreads the flanges open toward the original transversely flat plane of the sheet 14.

Mounting of the spreader plate 68 in the frame 40 is effected in a manner permitting fairly accurate adjustment of the plate for optimum spreading efficiency. For this purpose, the plate 68 is fixedly secured to a stem rod 70 which extends generally upwardly through a mounting block 71 carried on a cross bar 72 supported by the frame 40. Both the stem 70 and the cross bar 72 are desirably of cylindrical rod structure. To permit ready adjustment of the plate 68 about the axis of the stem 70 the block 71 is split vertically at its end adjacent the stem 70 for clamping the stem 70 in proper vertical and torsional position in the block 71 as by means of a takeup screw 73. Similarly, for clamping the spreader plate assembly in a proper attitude relative to the supporting bar 72, the block 71 is split horizontally at its end adjacent to the rod 72 and when the desired adjustment has been effected, the block is clamped tightly as by means of a takeup screw 74.

Adjacently downstream from the spreader plate 68, the spread apart side portions of the travelling sheet 14 are engaged by respective pairs of camber rollers 75 which bias and stretch the side portions away from one another and into the original plane of the sheet 14. The rollers 75 are supported by respective brackets 77 mounted on a cross bar 78 secured to an adjacent portion of the main frame 10.

Folding Station F

After the fully spread, transversely flattened sheet 14 leaves the spreading station E by way of the takeup roll assembly 41, the sheet enters the folding station F (FIGS. 1 and 8) wherein the folder 42 functions to fold the bag making assembly into the generally U-shaped as shown in FIG. 5. Immediately downstream from the roll assembly 41 is a generally downwardly oblique folding guide plate 79 which at its upper end is attached as by means of brackets 80 to a cross bar 81 supported by a skeleton frame 82 which may be mounted on a base 83 or an extension from the base 11, whichever arrangement may be preferred. The plate 79 tapers downwardly at its sides and adjacent to its lower end is attached to a stabilizer truss bar 84 secured to the frame 82.

As the bag making sheet assembly travels down the folder plate 79, and centered with respect to the lower tip end of the plate 79, the sheet 14 is caused to swing down at each side until it is entirely folded upon itself and passes through folder guide rollers 85 adjacently below the lower tip of the plate 79. Below the rollers 85, additional guide rollers 87 hold the folded sides of the now generally U-shape sheet 14 close together as the folded sheet advances along an upwardly and downwardly tapered fastener profile aligning shoe 88 (FIGS. 1, 8 and 9) projecting between the folded portions of the travelling sheet and supported by means of a rigid arm 89 attached to the frame 82. As the sheet travels on and along the shoe 88, the profiles 30 and 31 enter respective aligning guide grooves 90 in the sheet engaging surfaces of the shoe 88. Then, as the folded sheet leaves the lower tapered end of the shoe 88, a pair of squeeze rolls 91 squeeze the properly aligned profiles of the fastener strips 30 and 31 into interlocked relation as shown in FIG. 5. The thus folded sheet 14 with the interengaged fastener strips passes on between additional pinch rollers 92 and a guide roller 93 and leaves the folding station F.

Winding Station G

On entering the winding station G, after leaving the folding station F. the folded sheet 14 travels on through a takeup roller arrangement including spaced guide rollers 94 and a free floating takeup roller 95 and passes on to a winding reel 97 where the folded bag making material is wound into a storage roll 98. It will be understood, of course, that the windup reel 97 may be driven in any suitable well known manner in coordinated relations with the other components of the apparatus.

It will be understood that variations and modifications may be effected without departing from the spirit and scope of the novel concepts of this invention.

I claim as my invention:

1. A method of making bag material, comprising:
   advancing a continuous length sheet from a roll in a sheet supply station;
   turning said sheet from its opposite sides toward the body of the sheet in a flange turning station and forming flange portions having faces directed away from the body of the sheet;
   advancing the sheet with its turned flange portions into a joining station and therein assembling with, and permanently securing to, said faces complementary extruded separable fastener profile strips;
   conducting the sheet and secured fastener strips as an assembly from the joining station through a curing station;
   downstream from the curing station spreading said flange portions apart in a spreading station to lie generally in the plane of the sheet body;
   beyond the spreading station folding the sheet upon itself in a folding station and separably interengaging the profiles of said fastener strips; and
   after such interengaging of the fastener strips winding the folded sheet into a storage roll.

2. A method according to claim 1, wherein said sheet has one surface which is fusibly compatible with the extruded fastener strips, and in the turning of said flange portions exposing said compatible surface on said faces of the flange portions which are directed away from said sheet body.

3. A method according to claim 1, which includes in the forming of said flange portions biasing the flange portions toward one another.

4. A method according to claim 1, which comprises biasing said flanges away from one another after said spreading apart.

5. A method according to claim 1, which includes, as an incident to said folding of the sheet and joining of profiles, guiding said profiles into accurate registration with one another.

6. In a method of making bag material, the steps of:
   advancing toward a joining station a continuous length of sheet turned from opposite sides along a body portion of the sheet and thereby providing flange portions having faces directed away from said body portion; and
   in said joining station permanently securing extruded complementary separable fastener profile strips to said faces of the flange portions in an orientation which will permit subsequent separable interengaging of the profiles of the strips by bringing said flange portion faces into face-to-face relation.

7. A method according to claim 6, which comprises providing said faces of the flange portions with surfaces which are fusibly compatible with the material of said fastener profile strips, and fusibly securing the fastener strips to said face surfaces.

8. A method according to claim 7, including downstream from said joining station running said sheet with the joined profile strips through a curing station.

9. A method according to claim 8, which comprises downstream from said curing station, spreading said flange portions apart substantially into a common plane with said sheet body.

10. A method according to claim 9, comprising after said spreading, folding the sheet upon itself and joining the profiles of said strips.

11. A method according to claim 6, which comprises running said sheet and the secured fastener strips through a spreading station, and in the spreading station spreading the flange portions into substantially a common plane with the body of the sheet.

12. A method according to claim 11, which comprises as an incident to said spreading, stretching said flange portions laterally relative to the body of the sheet.

13. A method according to claim 6, which comprises downstream from said joining station, folding said sheet body upon itself and bringing said flange portion faces into face-to-face relation, and joining the profiles of said strips together.

14. A method according to claim 6, which comprises turning said flange portions onto said body of the sheet, and biasing said flange portions toward one another, and bringing edges of said flange portions into adjacent relation.

15. Apparatus for making bag material, comprising:
   means for advancing a continuous length sheet from a roll in a sheet supply station;
   means for turning said sheet from opposite sides toward the body of the sheet in a flange turning station and thereby forming flange portions having faces directed away from the body of the sheet;
   means for advancing the sheet with its turned flange portions into a joining station and means for therein assembling with, and permanently securing to said faces complementary extruded separable fastener profile strips;
   means for conducting the sheet and secured fastener strips as an assembly from the joining station through a curing station;
   means downstream from the curing station for spreading said flange portions apart in a spreading station to lie generally in the plane of the sheet body;
   means beyond the spreading station for folding the sheet upon itself in a folding station and for separably joining the profiles of said fastener strips; and
   means in a winding station located downstream from said folding station for winding the folded sheet into a roll.

16. Apparatus according to claim 15, wherein said faces of the flange portions have fusibly compatible surfaces with relation to material of said fastener profile strips, and means for fusibly securing said fastener strips to said surfaces of said faces.

17. Apparatus according to claim 15, wherein said turning means include means for biasing said flange portions toward one another.

18. Apparatus according to claim 15, including means at said spreading station for biasing said flange portions away from one another.

19. Apparatus according to claim 15, including means at said folding station for guiding said profiles into registration with one another for effecting the interengagement of the profiles.

20. In an apparatus for making bag material:
a joining station and means for advancing into said joining station a continuous length of sheet turned from opposite sides and thereby providing flange portions having faces directed away from the body of the sheet; and
means in said joining station for permanently securing extruded complementary separable fastener profile strips to said faces of the flange portions in an orientation which will permit subsequent separable interengaging of the profile strips by bringing said flange portions faces into face-to-face relation.

21. Apparatus according to claim 20, wherein said faces of the flange portions are provided with surfaces which are fusibly compatible with the material of said fastener profile strips, and means for fusibly securing the fastener strips to said face surfaces.

22. Apparatus according to claim 21, including means downstream from said joining station for running said sheet with the joined profile strips through a curing station.

23. Apparatus according to claim 22, which comprises means downstream from said curing station for spreading said flange portions apart substantially into a common plane with said sheet body.

24. Apparatus according to claim 23, comprising means downstream from said spreading means for folding the sheet upon itself and joining the profiles of said strips.

25. Apparatus according to claim 20, comprising means for running said sheet and the secured fastener strips through a spreading station, and means in the spreading station for spreading the flange portions into substantially a common plane with the body of the sheet.

26. Apparatus according to claim 25, comprising means for stretching said flange portions laterally relative to the body of the sheet as an incident to said spreading.

27. Apparatus according to claim 20, which comprises means downstream from said joining station for folding said sheet body upon itself and for bringing said flange portion faces into face-to-face relation and for joining the profiles of said strips together.

28. Apparatus according to claim 20, which comprises means for turning said flange portions onto said body of the sheet, and means for stretching said flange portions toward one another and bringing edges of said flange portions into adjacent relation.

* * * * *